United States Patent
Habra

(10) Patent No.: US 10,776,977 B2
(45) Date of Patent: *Sep. 15, 2020

(54) REAL-TIME LIP SYNCHRONIZATION ANIMATION

(71) Applicant: TD Ameritrade IP Company, Inc., Omaha, NE (US)

(72) Inventor: Abd Alrazzak Habra, Bloomfield, MI (US)

(73) Assignee: TD Ameritrade IP Company, Inc., Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,418

(22) Filed: Feb. 11, 2019

(65) Prior Publication Data

US 2019/0172241 A1 Jun. 6, 2019

Related U.S. Application Data

(63) Continuation of application No. 15/678,924, filed on Aug. 16, 2017, now Pat. No. 10,217,260.

(51) Int. Cl.
*G06T 13/20* (2011.01)
*G06T 13/40* (2011.01)
*G10L 21/10* (2013.01)

(52) U.S. Cl.
CPC .......... *G06T 13/205* (2013.01); *G06T 13/40* (2013.01); *G10L 21/10* (2013.01); *G06T 2200/04* (2013.01); *G10L 2021/105* (2013.01)

(58) Field of Classification Search
None
See application file for complete search history.

(56) References Cited

U.S. PATENT DOCUMENTS 5,983,190 A * 11/1999 Trower, II ............... G06F 8/00
704/275
2009/0044112 A1* 2/2009 Basso .................. G06T 13/205
715/706

(Continued)

FOREIGN PATENT DOCUMENTS

JP 2011164763 A 8/2011
KR 20140133056 A 11/2014

OTHER PUBLICATIONS

International Search Report and Written Opinion for PCT Application No. PCT/US2019/017882; dated Nov. 13, 2019; 12 pages.

*Primary Examiner* — Said Broome
(74) *Attorney, Agent, or Firm* — Harness, Dickey & Pierce, P.L.C.

(57) ABSTRACT

A device includes a processor and a memory that stores predetermined data including a progressive transition rule and animation models. Each of the animation models corresponds to a respective phoneme. The memory stores instructions including receiving a request from a user and obtaining an answer to the request. The answer includes first and second indicators that correspond to first and second phonemes. The instructions include, according to the first indicator, identifying a first animation model that corresponds to the first phoneme. The instructions include, according to the second indicator, identifying a second animation model that corresponds to the second phoneme. The instructions include generating a transition animation model according to the progressive transition rule using the first and second animation models. The instructions include generating images according to the first, second, and transition animation models. The instructions include outputting the images to the user via a display.

20 Claims, 9 Drawing Sheets

(56) References Cited

U.S. PATENT DOCUMENTS

| | | |
|---|---|---|
| 2017/0301125 A1 | 10/2017 | Bouaziz et al. |
| 2017/0345201 A1 | 11/2017 | Lin et al. |
| 2018/0253881 A1 | 9/2018 | Edwards et al. |

* cited by examiner

REAL-TIME LIP SYNCHRONIZATION ANIMATION

CROSS-REFERENCE TO RELATED APPLICATIONS

This application is a continuation of U.S. patent application Ser. No. 15/678,924 (now U.S. Pat. No. 10,217,260) filed Aug. 16, 2017. The entire disclosure of the application referenced above is incorporated by reference.

FIELD

Embodiments generally relate to computer animation.

BACKGROUND

An animated virtual assistant is a computer animated figure that can interact with a user. For example, a user may ask a question, and the computer animated virtual assistant can "talk" to the user with an answer to the user's question.

SUMMARY

A method for real-time lip synchronization is provided. The method transmits, by one or more processing devices, a requested document comprising embedded instructions to a client device. The one or more processing devices generate a plurality of phonemes responsive to an additional request from the client device. The one or more processing devices transmit the plurality of phonemes to the client device responsive to the additional request. The embedded instructions direct the client device to generate animation models and transition models based on the plurality of phonemes in sync with the generated sound.

The plurality of phonemes comprise a first phoneme and a second phoneme. The embedded instructions direct the client device to process the first phoneme and the second phoneme by receiving the first phoneme and the second phoneme, generating a first animation model based on the first phoneme, generating a second animation model based on the second phoneme, and generating one or more transition models based on the first animation model, the second animation model, and a progressive transition rule.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form a part of the specification, illustrate embodiments of the invention and, together with the description, further serve to explain the principles of the embodiments and to enable a person skilled in the relevant art to make and use the embodiments.

The drawing in which an element first appears is typically indicated by the leftmost digit or digits in the corresponding reference number. In the drawings, like reference numbers may indicate identical or functionally similar elements.

DETAILED DESCRIPTION

Figure 1A:
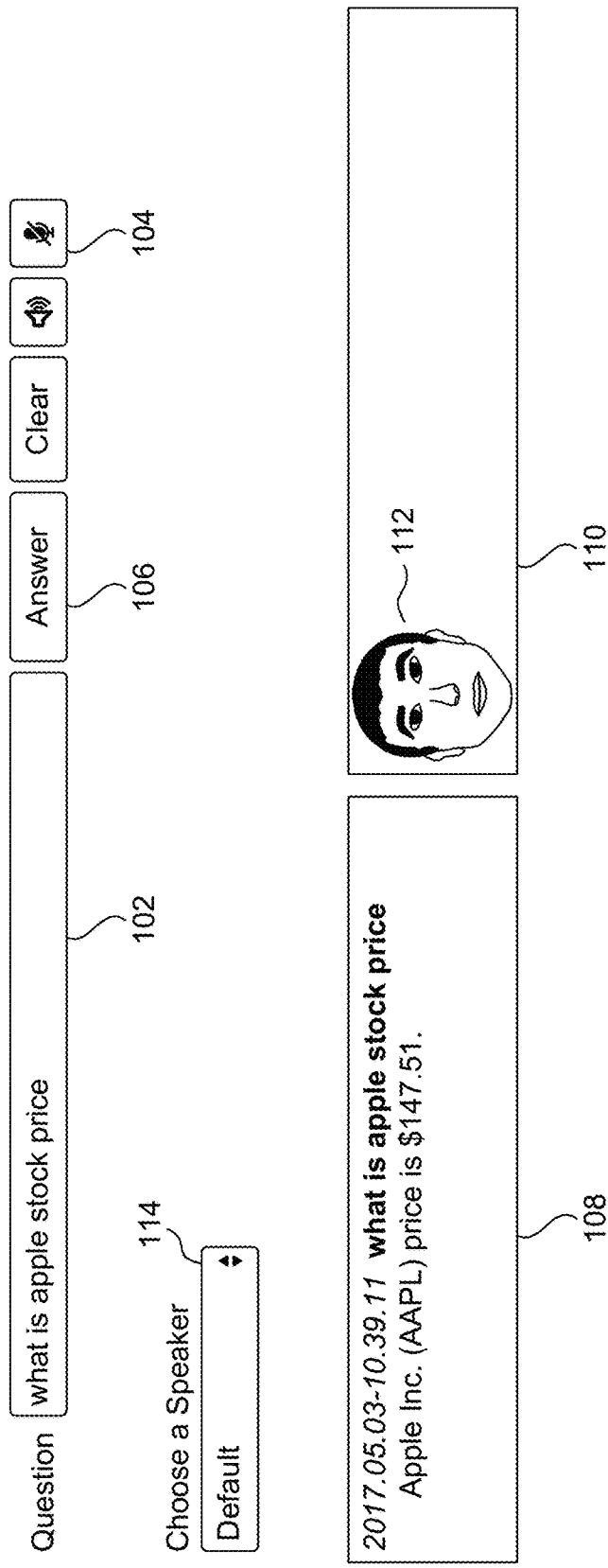
FIG. 1A illustrates an example user interface utilizing an animated virtual assistant, according to some embodiments.

One technical problem related to creating a computer animated virtual assistant is to match the shape of the mouth of an animated figure to the speech pronounced by the animated virtual assistant. Solutions to such technical problem are also called lip synchronization. Lip synchronization techniques can be used in different areas such as movies, automated dialogue replacement (ADR), cartoons, videos, and language dubbing. Depending on the context, different lip synchronization techniques may be utilized.

One lip synchronization technique is called "morph target." This technique uses a series of models. One of the models is called a reference model that represents a neutral position of the mouth. Other models represent a plurality of mouth shapes. Each mouth shape corresponds to a phoneme, or a set of phonemes. A phoneme is a perceptually distinct unit of a sound in a specified language. Each model is called a morph target model. Each morph target model has the same number of vertices. Further, each vertex in a morph target model may correspond to a vertex in another morph target model. Lip synchronization using the morph target technique involves tracking the movement of vertices over different morph target models, each corresponding to one or more phonemes.

Lip synchronization may also occur in a client-server environment. For example, a server may use the techniques described above and compute the coordinates of vertices for a series of models, each model being time aligned with a corresponding spoken sound. The server then transmits the computed coordinates to a client device, and the client device uses the coordinates, transmitted from the server, to display the lip synchronized animation to a user of the client device.

In some context, the speed of animating lip synchronization is not a major issue. Lip synchronization is typically handled ahead of time given the processing-intensive nature of the task, and these approaches are not suitable for real-time processing. For example, to produce an animated movie, the movie producer may use a farm of computers that can spend hours, or even days, to create just one frame of the animated movie. All the created frames are then combined together into the animated movie. In such context, the speed of animating lip synchronization is not particularly important.

However, in other context, the speed of lip synchronization animation can become a major concern. For example, in the context of a computer animated virtual assistant, the animated virtual assistant may need to interact with a user in real-time. Thus, animating lip synchronization for a computerized virtual assistant requires efficient computer performance to satisfy the need of real-time interaction.

The techniques described above often do not meet the real-time performance requirement. For example, keeping track of a large number of coordinates of vertices could cause significant delays. In a client-server environment, the techniques described above could result in further delay. For example, transmission of a large number of coordinates from servers to the client devices could cause network congestion. Also, a server could become a single point of delay bottleneck if the server computes coordinates of vertices for numerous client devices.

Accordingly, techniques for real-time efficient animation of lip synchronization are desired.

FIG. 1A illustrates an example user interface 100 utilizing an animated virtual assistant, according to some embodiments. User interface 100 allows vocal interaction between a user and the user's device. The user's device may be a client device that displays user interface 100 to the user. The user may use user interface 100 to input a question by typing in the question in box 102. Alternatively, the user may click on button 104 to enable speech recognition, and the user can communicate the question by speaking to a microphone of the client device. A speech recognition subsystem in the client device then converts the user's speech into the question in the text format.

Once the user clicks on button 106, the client device may transmit the question to a server. The server may find an answer to the question and transmit the answer back to the client device. The client device can display the answer in area 108. In addition, the client device may display animated virtual assistant 112 in area 110. Animated virtual assistant 112 may "speak" the answer to the user, and the client device may animate virtual assistant 112 such that the mouth shape of virtual assistant 112 could match the speech by virtual assistant 112. Furthermore, a user can configure an accent type by selecting an option in box 114 (e.g., "North American English—Female" or "British English—Male"). Animated virtual assistant 112 may talk in the accent type as configured.

Figure 1B:
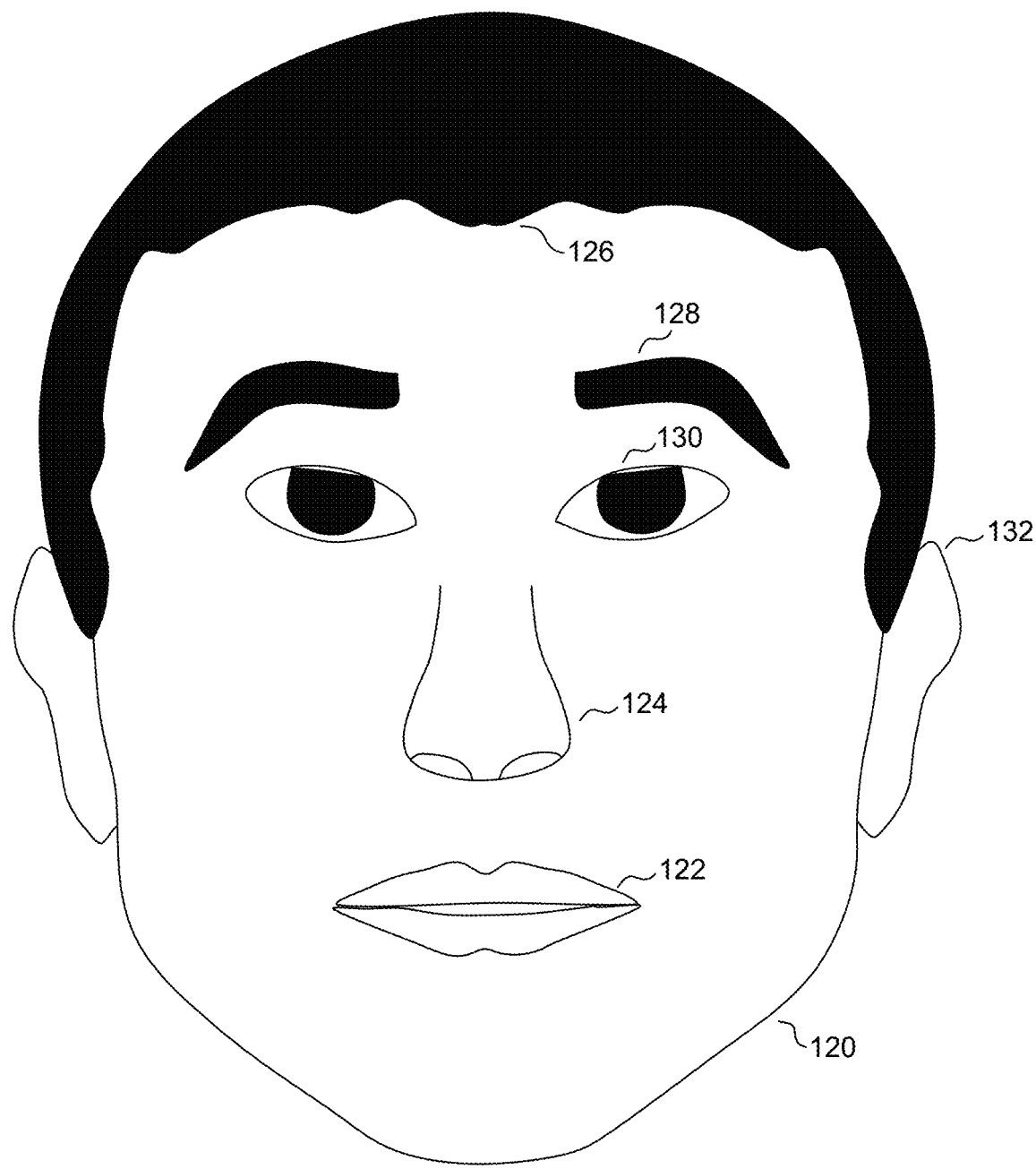
FIGS. 1B and 1C illustrate exemplary faces of an animated virtual assistant, according to some embodiments.
Figure 1C:
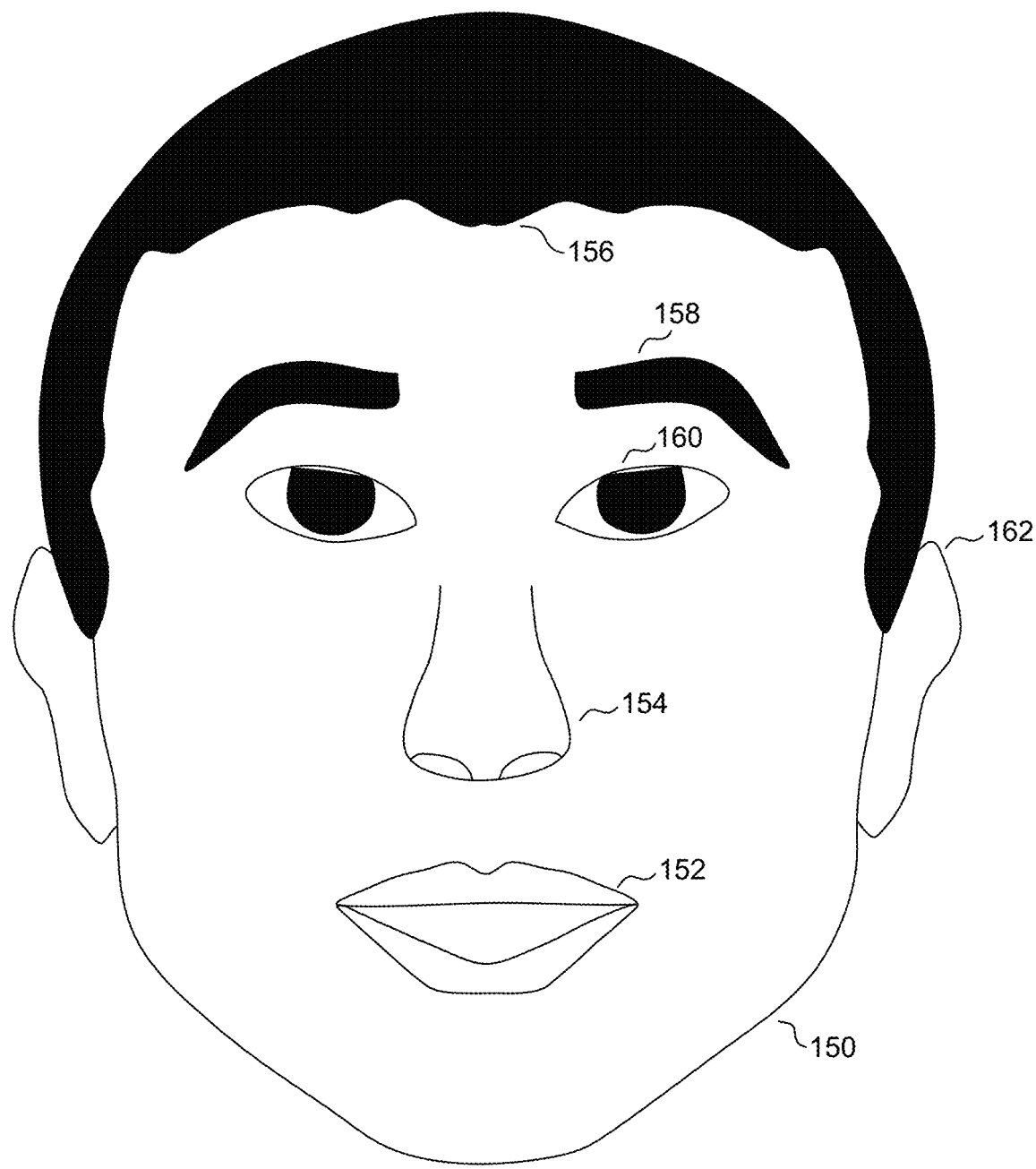

FIGS. 1B and 1C illustrate exemplary faces of an animated virtual assistant, according to some embodiments. In other embodiments, additional body components, such as necks, shoulders, and arms of virtual assistants may be displayed. A client device may display face 120 in FIG. 1B when the animated virtual assistant pronounces a phoneme. The client device may display face 150 in FIG. 1C when the animated virtual assistant pronounces another different phoneme. When two different phonemes are pronounced, the shape of mouth 122 is different from the shape of mouth 152. In one embodiment, to improve efficiency, facial features other than the mouth remain static throughout the animation. For example, nose 124, hair 126, eyebrows 128, eyes 130, and ears 132 remain the same as nose 154, hair 156, eyebrows 158, eyes 160, and ears 162, respectively, even though the animated virtual assistant pronounces two different phonemes.

An animation model may represent the face of an animated virtual assistant when the virtual assistant pronounces a phoneme. As the shape of the mouth of the animated virtual assistant changes, an animation model includes modeling of the mouth. To improve efficiency and satisfy real-time animation of lip synchronization, an animation model may include a width factor and an openness factor. The width factor indicates how wide horizontally the mouth is. The openness factor indicates how open vertically the mouth is.

Figure 2:
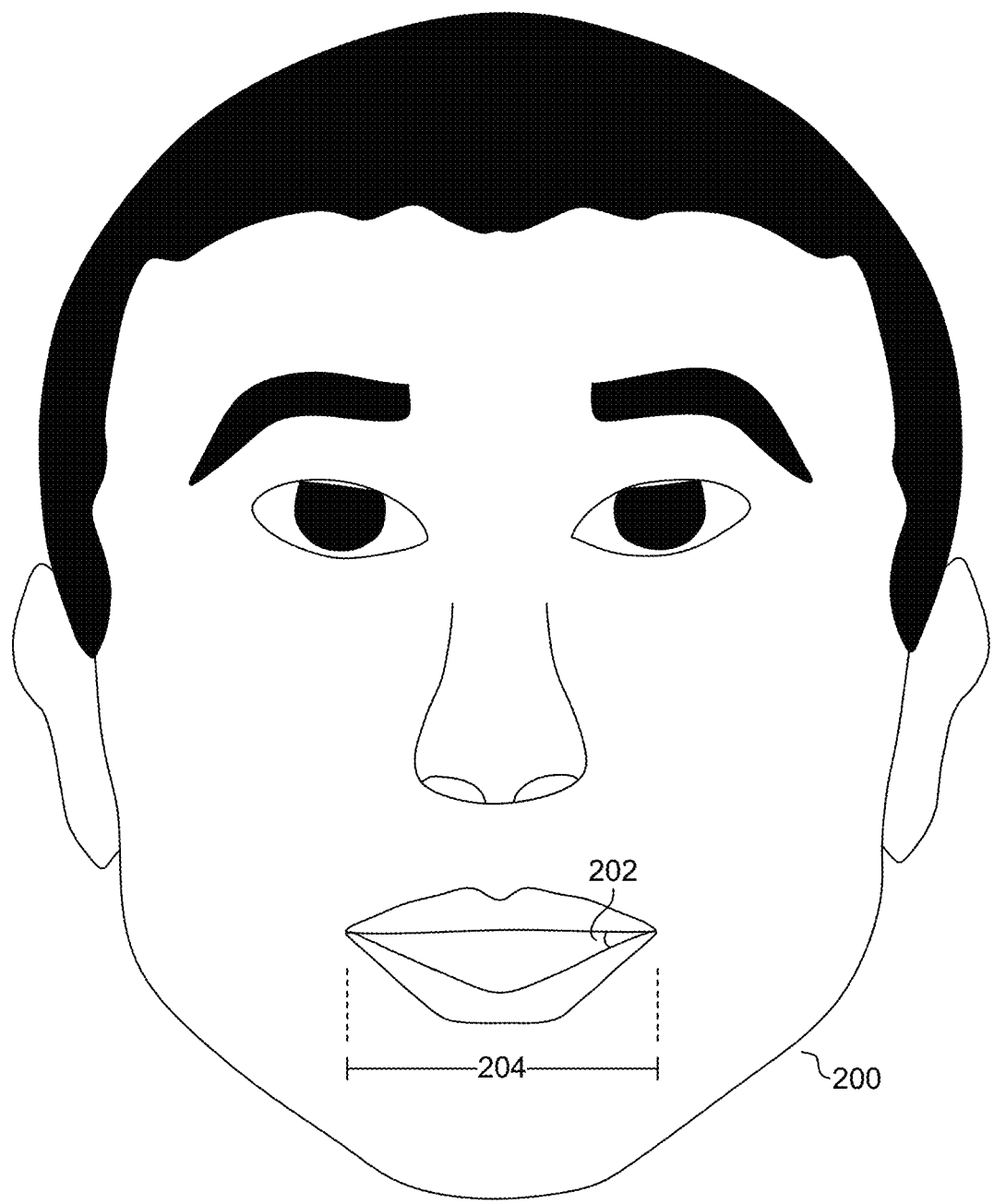
FIG. 2 illustrates modeling of an exemplary face of an animated virtual assistant, according to some embodiments.

FIG. 2 illustrates modeling of an exemplary face of an animated virtual assistant, according to some embodiments. In particular, animation models may use width factors and openness factors described above to model the mouth movement of the face. In face 200, a width factor is represented by a shift value such as shift value 204, and an openness factor is represented by an angle value such as angle value 202. In one embodiment, the client device uses attributes in an animation model, including angle value 202 and shift value 204, in addition to attributes for static features, such as nose 124, hair 126, eyebrows 128, eyes 130, and ears 132, to display a face corresponding to a phoneme.

In another embodiment, an animation model may only include a width factor and an openness factor. Attributes for static features, such as nose 124, hair 126, eyebrows 128, eyes 130, and ears 132, are stored in a static model. The client device may use both an animation model and the static model to display a face corresponding to a phoneme.

Figure 3:
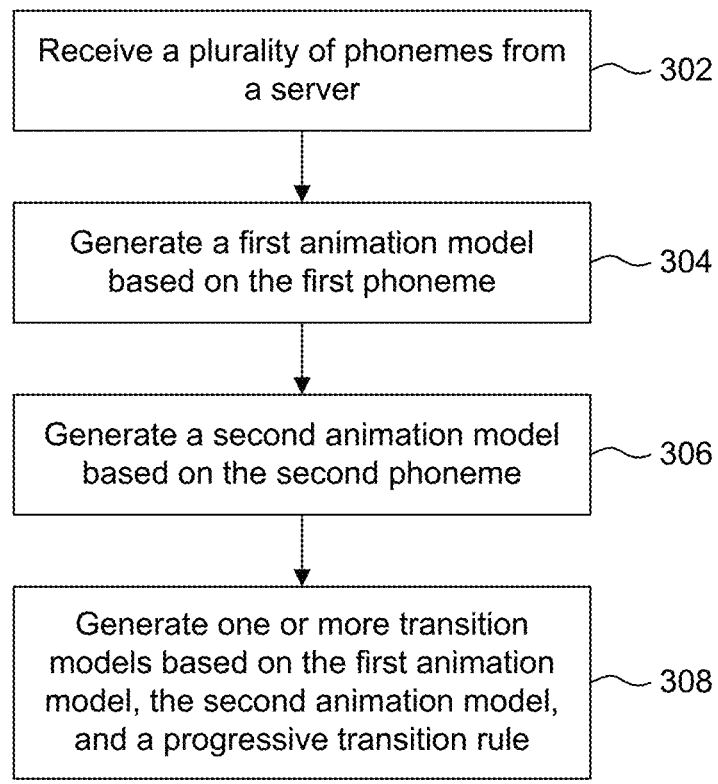
FIG. 3 is a flowchart of a method for generating models for animation of lip synchronization in real-time, according to some embodiments.

FIG. 3 is a flowchart of method 300 for generating models for animation of lip synchronization in real-time, according to some embodiments.

Method 300 starts at operation 302, where a client device receives a plurality of phonemes from a server. The received phonemes correspond to words to be spoken by an animated character, such as an animated virtual assistant, at the client device. For example, a user could use the client device to ask a question, and the client device in turn sends the question to a server. If the server finds an answer to the question, the server may send the answer back to the client in the form of words and sentences. To improve efficiency of animation at the client device, the server may convert the words in the answer into corresponding phonemes, and send the phonemes to the client device.

In some embodiments, the client device itself may have the answer to the question. In these embodiments, the client device converts the answer into corresponding phonemes, and the client device receives the phonemes by itself.

In one embodiment, the client device may receive the answer in the text format together with the plurality of phonemes. For instance, if the answer is "Apple Inc. (AAPL) price is $147.51," the client device may receive, from the server, the answer text and the corresponding phonemes in the following format:

[
{"word": "Apple", "phonemes": ["AE", "P", "AH", "L"]},
{"word": "Inc.", "phonemes": ["IH", "NG", "K"]},
{"word": "(AAPL)", "phonemes": ["ER", "AH", "AO", "P", "AH", "L", "Y", "LW"]},
{"word": "price", "phonemes": ["P", "R", "AY", "S"]},
{"word": "is", "phonemes": ["IH", "S"]},
{"word": "$147.51.", "phonemes": ["AH", "N", "AO", "R", "IY", "AH", "N", "IY"]}
].

The client device may use a speech synthesis subsystem to convert the answer in the text format to speech (e.g., sound waves) for virtual assistant 112. The client device may use the phonemes to animate virtual assistant 112 utilizing lip synchronization techniques described below.

In another embodiment, the client device may receive only phonemes. The client device uses the phonemes to create the speech and animate virtual assistant 112 utilizing lip synchronization techniques described below.

In yet another embodiment, the client device may receive the answer in the text format and convert the answer in the text format to speech (e.g., sound waves) for virtual assistant 112. The client device may also convert the answer in the text format to phonemes and use the phonemes to create the speech and animate virtual assistant 112 utilizing lip synchronization techniques described below.

The phonemes include at least a first phoneme and a second phoneme. At operation 304, the client device generates a first animation model based on the first phoneme. For example, the client device may store a plurality of animation models, and each animation model corresponds to a phoneme, or a set of phonemes. The client device may build a lookup table for the animation models, using the phonemes as the search keys.

To improve efficiency and allow real-time animation, the client device may only animate the movement of the mouth of an animated virtual assistant, in some embodiments. To further improve efficiency, the animation of the mouth is based on the horizontal width and the vertical openness of the mouth. Thus, each animation model may include a width factor indicating how wide horizontally a mouth is in the animation model and an openness factor indicating how open vertically the mouth is in the animation model. In one embodiment, a width factor is represented by a shift value such as shift value 204 illustrated in FIG. 2. An openness factor is represented by an angle value such as angle value 202 illustrated in FIG. 2.

In some embodiments, as the width factors and openness factors provide enough information for the client device to animate mouth movement, an animation model may include only a width factor and an openness factor. The static portions of the animated character may be stored in a separate static model. In these embodiments, the generated first animation model may only include a first width factor and a first openness factor, which may be retrieved from a lookup table described above.

At operation 306, the client device generates a second animation model based on the second phoneme. Similar to the generation of the first animation model, the client device may retrieve, from the lookup table, the animation model corresponding to the second phoneme, using the second phoneme as the search key. In the embodiments where each animation model includes only a width factor and an openness factor, the generated second animation model may only include a second width factor and a second openness factor.

The first and second animation models respectively correspond to the first and second phonemes that may be two consecutive phonemes in time. For example, the server may transmit three phonemes, "K," "AE," and "T" (corresponding to the word "cat"), to the client device. In this example, "K" may be the first phoneme and "AE" may be the second phoneme because they are consecutive to each other in time. Similarly, in another example, the server may transmit four phonemes, "AE," "P," "AH," and "L" (corresponding to the word "apple"), to the client device. In this example, "AE" may be the first phoneme and "P" may be the second phoneme because they are consecutive to each other in time.

The shape of the mouth could vary drastically from pronouncing one phoneme to another phoneme. Thus, if the display of the first animation model corresponding to the first phoneme immediately shifts to the display of the second animation model corresponding to the second phoneme, the resulting animation may appear unnatural to a viewing user. To solve this technical issue, the client device may generate one or more transition models at operation 308. The one or more transition models could help smooth the transition from displaying the first animation model to displaying the second animation model.

The one or more transition models do not correspond to any phonemes. Rather, the one or more transition models represent a brief transition period from pronouncing the first phoneme to the second phoneme. The client device may display the one or more transition models after displaying the first animation model but before displaying the second animation model.

A transition model can include the same types of attributes as an animation model, based on approaches described in FIG. 2. For example, a transition model may include a width factor and an openness factor. The client device may generate the one or more transition models based on the first transition model, the second transition model, and a progressive transition rule. The client device may determine a transition duration period, which is the time period between displaying the first animation model corresponding to the first phoneme and displaying the second animation model corresponding to the second phoneme. The transition duration period may be in the unit of the number of transition frames.

The transition duration period may also be in the unit of time. In this case, the client device may convert the transition duration period in time to the number of transition frames. For example, if the transition duration period is 0.2 second, for an animation rate of 30 frames per second, the client device may convert 0.2 second to 6 frames (one fifth of 30 frames).

Each transition frame during the transition time period may represent a face with a different mouth shape as the animation transitions from the first animation model to the second animation model. So, each transition frame may correspond to one different transition model. For example, each transition model may be represented by a different width factor and a different openness factor.

Once the client device determines the number of transition frames for the transition period, for each transition frame, the client device generates a corresponding transition model based on the first animation model, the second animation model, a position of the transition frame in the number of transition frames, and the progressive transition rule.

In some embodiments, the progressive transition rule specifies a linear progression rule. To generate a transition model associated with a transition frame, the client device may perform linear interpolation between the first animation model and the second animation model based on the position of the transition frame in the number of transition frames. As discussed above, in some embodiments, an animation model may include a width factor and an openness factor. So, the first animation model may include a first width factor and a first openness factor, and the second animation model may include a second width factor and a second openness factor. If there are N frames for the transition period, according to the linear progressive transition rule, for a transition model associated with a transition frame located at frame position p, the width factor for this transition model may be [(p/N)*(first width factor)+(1−p/N)*(second width factor)]. The openness factor for this transition model may be [(p/N)*(first openness factor)+(1−p/N)*(second openness factor)].

For example, if the transition duration period is 10 frames, according to the linear progressive transition rule, for a transition model associated with the third transition frame in the 10 transition frames, the width factor for this transition model could be [0.3*(first width factor)+0.7*(second width factor)].)]. The openness factor for this transition model would be [0.3*(first openness factor)+0.7*(second openness factor)].

As described above in FIG. 2, in some embodiments, a width factor is represented by a shift value, and an openness factor is represented by an angle value. In these embodiments, if there are N frames for the transition period, according to the linear progressive transition rule, for a transition model associated with a transition frame located at frame position p, the shift value for this transition model would be [(p/N)*(first shift value)+(1−p/N)*(second shift value)]. The angle value for this transition model would be [(p/N)*(first angle value)+(1−p/N)*(second angle value)].

By modeling mouth movement with a limited number of elements (for example width factors and openness factors), the efficiency of lip synchronization animation improves to satisfy real-time animation. The efficiency gain comes from simplified models and from the resulting faster rendering time for the simplified models. The efficiency gain further comes from faster generation of the transition models because only a limited number of model attributes need to be interpolated.

In some embodiments, for the transition from displaying the first animation model to displaying the second animation model to appear even smoother, the client device may utilize a progressive transition rule that specifies a non-linear progression rule based on a continuous curve function. Because only a limited number of model attributes need to be interpolated to generate the transition models, even non-linear progression can still achieve real-time animation of lip synchronization. In these embodiments, the client device may perform non-linear interpolation between the first animation model and the second animation model based on the position of the transition frame in the number of transition frames and the continuous curve function to generate a transition model associated with the transition frame.

The continuous curve function may be based on a continuous function that ranges or can be normalized to range from 0 to 1. For instance, the continuous curve function may be based on a sine function. For example, as the sine function over [0 ... π/2] ranges from [0 ... 1], a non-linear progressive transition rule may specify the following transition rule: if there are N frames for the transition period, for a transition model associated with a transition frame located at position p, the width factor for this transition model would be [sine ((p/N)*(π/2))*(first width factor)+(1−sine((p/N)*(π/2)))*(second width factor)]. The openness factor for this transition model would be [sine ((p/N)*(π/2))*(first openness factor)+(1−sine((p/N)*(π/2)))*(second openness factor)].

In some embodiments, the non-linear progressive transition rule may be based on other non-linear functions, such as a cosine function or a Gaussian function, normalized to range from 0 to 1. Further, the non-linear progressive transition rule may be based on a combination of multiple non-linear functions described above, normalized to range from 0 to 1.

Figure 4:
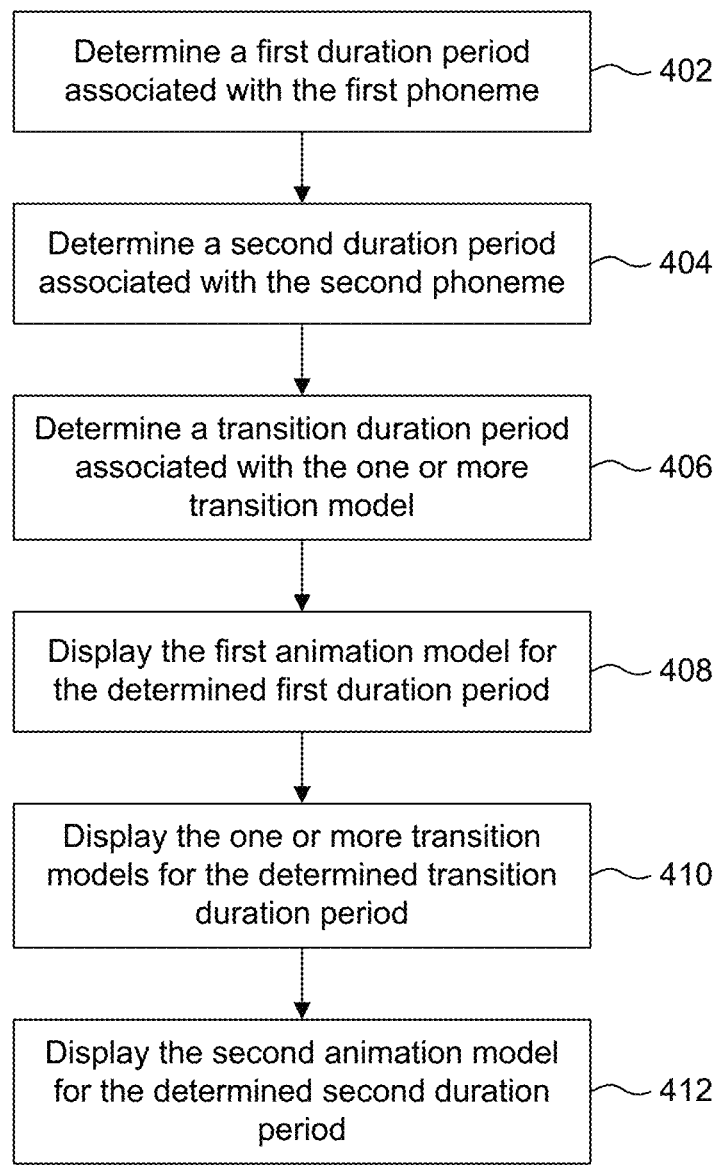
FIG. 4 is a flowchart of a method for displaying lip synchronized animation, using the generated animation models, according to some embodiments.

FIG. 4 is a flowchart of method 400 for displaying lip synchronized animation, using the animation models generated by method 300, according to some embodiments.

Method 400 starts at operation 402, where the client device determines a first duration period associated with the first phoneme. The first duration period is the length of time for which the client device will play the audio sound of the first phoneme and display the first animation model associated with the first phoneme at the same time. The client device may determine the first duration period based on an accent type indicated by a user. The accent type may be a part of the user settings, stored either on the client device or on the server. For example, for the same phoneme, the duration period for the accent type, "North American English—Female" may be different from the duration period for the accent type, "British English—Male."

At operation 404, the client device determines a second duration period associated with the second phoneme. The second duration period is the length of time for which the client device will play the audio sound of the second phoneme and display the second animation model associated with the second phoneme at the same time. Again, the client device may determine the second duration period based on the accent type indicated by a user. In one embodiment, the client device may determine the same duration for all phonemes for the same accent type. Thus, in this embodiment, the first duration period and the second duration period are the same. In another embodiment, the duration period for the first phoneme is different from the duration for the second phoneme. For example, for each accent type, the client device may use a different lookup table for retrieving a duration period corresponding to a phoneme.

At operation 406, the client device determines a transition duration period associated with the one or more transition models. The transition duration period is the length of time for which the client device will display the one or more transition models. When the transition duration period is in the unit of the number of the frames, or is converted into the unit of the number of the frames, the number of the transition models is the number of the frames. For example, for a frame rate of 30 frames per second, a transition duration period of 0.2 second corresponds to 6 frames, which have 6 corresponding transition models.

The client device may determine the transition duration period based on the first duration period and the second duration period. In one embodiment, the client device may use a fraction of the average of the first and the second duration periods as the transition duration period. For example, the transition duration period may be 0.1*(the first duration period+the second duration period)/2.

Further, the client device may set a minimum threshold for the transition duration period. If the calculated duration period based on the first and the second duration periods is less than the minimum threshold, the client device may instead use the minimum threshold as the transition duration period. For example, the client device may set the minimum threshold to be 3 frames. If the client device calculates a transition duration period based on the first and the second duration periods and the calculated transition duration period is less than 3 frames, the client device may instead use 3 frames as the transition duration period.

The client device may also set a maximum threshold for the transition duration period. If the calculated duration period based on the first and the second duration periods is more than the maximum threshold, the client device may instead use the maximum threshold as the transition duration period. For example, the client device may set the maximum threshold to be 10 frames. If the client device calculates a transition duration period based on the first and the second duration periods and the calculated transition duration period is more than 10 frames, the client device may instead use 10 frames as the transition duration period.

At operation 408, the client device displays the first animation model (which corresponds to the first phoneme) for the determined first duration period. At operation 410, after displaying the first animation model, the client device displays the one or more transition models for the determined transition duration period. Each transition model may correspond to a transition frame. At operation 412, after displaying the one or more transition models, the client device displays the second animation model for the second duration period.

When creating the corresponding speech audio, the client device uses the determined first and second duration periods to determine how long the first and the second phonemes should be pronounced, respectively. The client device also uses the determined transition duration period to determine how long the pause should be between the pronunciation of the first phoneme and the pronunciation of the second phoneme.

For the remaining received phonemes (if any), the client device may repeat the operations by generating animation models and transition models, determining duration periods, displaying the models for the determined duration periods, and creating the speech audio, in accordance with the methods described with respect to FIGS. 3 and 4.

The client device may perform method 300 and method 400 serially. For example, the client device may generate animation models and transition models first, and then determine the duration periods and display the animation models and the transition models. In other embodiments, the client device may perform method 300 and method 400 in a pipelined fashion. For instance, the client may display the first animation model while generating the second animation model and the transition models between the first and the second animation models.

The client device may run a standalone application to perform the operations described in methods 300 and 400. In other embodiments, a server may provide instructions to the client device, and the client device may run the instructions to perform methods 300 and 400.

Figure 5:
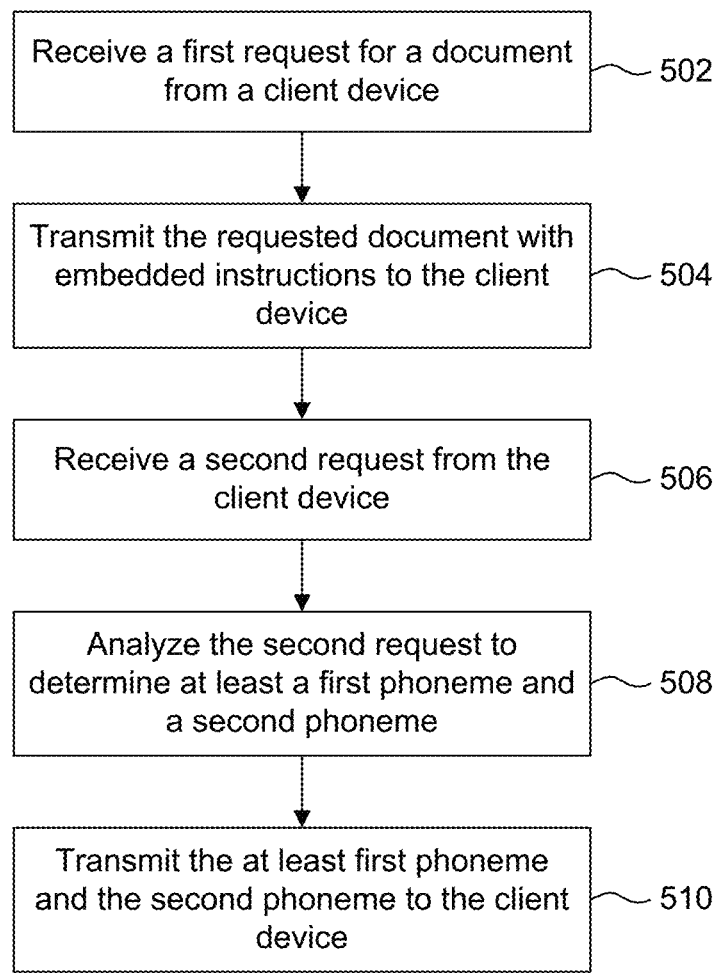
FIG. 5 is a flowchart of a method for a server to provide a real-time animated virtual assistant to a client device utilizing lip synchronization techniques.

FIG. 5 is a flowchart of method 500 for a server to provide a real-time animated virtual assistant to the client device utilizing lip synchronization techniques described above. Method 500 provides an example where efficient lip synchronization techniques can be useful in a server-client environment.

Method 500 starts at operation 502, where a server receives a first request for a document from a client device. The first request may be a hypertext transfer protocol (HTTP) request. The first request may be sent by a remote client device used by a user. The user may initiate the first request by using a web browser. The web browser transmits the first request to the server, which may run a web server application.

At operation 504, the server returns a response including the requested document with embedded instructions to the client device. The response may be an HTTP response, and the requested document may be a HyperText Markup Language (HTML) file. The HTML file may include or refer to embedded instructions (such as JavaScript scripts). The client device may run the embedded instructions to perform the operations described in methods 300 and 400. The client device may display the HTML file, returned by the server, as a web page.

At operation 506, the server receives a second request. The second request may also be an HTTP request. The second request may contain a question, in the form of a string. The user may use the client device to initiate the question. For example, the user may input the question using a keyboard and a mouse. The user may also use a speech recognition subsystem to convert the user's question in voice to a question in a textual string. The web browser then sends the question to the server.

At operation 508, the server analyzes the second request. For instance, the server may analyze the question contained in the second request, and find a proper answer to the question. For example, the server may analyze the question in the string format, and determine that the question is inquiring about the temperature of a location at a certain time. Based on the result of the analysis, the server may send a query to a knowledge provider. After the knowledge provider sends back the result temperature data for the specific location and time to the server, the server then forms an answer to the question based on the result temperature data.

The server may provide to the client device an animated virtual assistant that can "speak" the answer with animated lip synchronization. For instance, the server may construct models of animation and transmit the models to the client device. For example, the server may construct models for each frame of the animation in the form of coordinates of the vertices representing the animated virtual assistant. The server may then transmit the coordinates to the client device. Such approach may not be efficient enough to satisfy the real-time performance requirement for displaying an animated virtual assistant in real time. For example, transmitting coordinates over the network could consume a lot of network resources and cause network congestion and delays. Also, constructing animation models for numerous client devices by the server could create even further delays. To improve efficiency of lip synchronized animation in a client-server environment, the server may convert the answer to a plurality of phonemes and only transmit the phonemes to the client device. The client device may run the embedded instructions provided by the server to animate the virtual assistant by processing the transmitted plurality of phonemes, using techniques described above in methods 300 and 400.

The server may create a plurality of phonemes based on the answer. For example, the server may maintain a phoneme lookup table, and use the phoneme lookup table to convert the answer (in the form of a string of words) to the plurality of phonemes. At operation 510, the server transmits the plurality of phonemes to the client device. After receiving the phonemes, the client device executes the embedded instructions to process received phonemes and display an animated virtual assistant, using techniques described above in methods 300 and 400.

In one alternative embodiment, instead of transmitting the phonemes to the client device, the server may continue process the phonemes to generate animation models and transition models, using techniques described in method 300. The server may then transmit the generated animation models and transition models to the client device. Because there are a limited number of elements in each model, transmission of the models still allows real-time performance. After receiving the animation models and transition models from the server, the client device may display an animated virtual assistant, using techniques described above in method 400.

Figure 6:
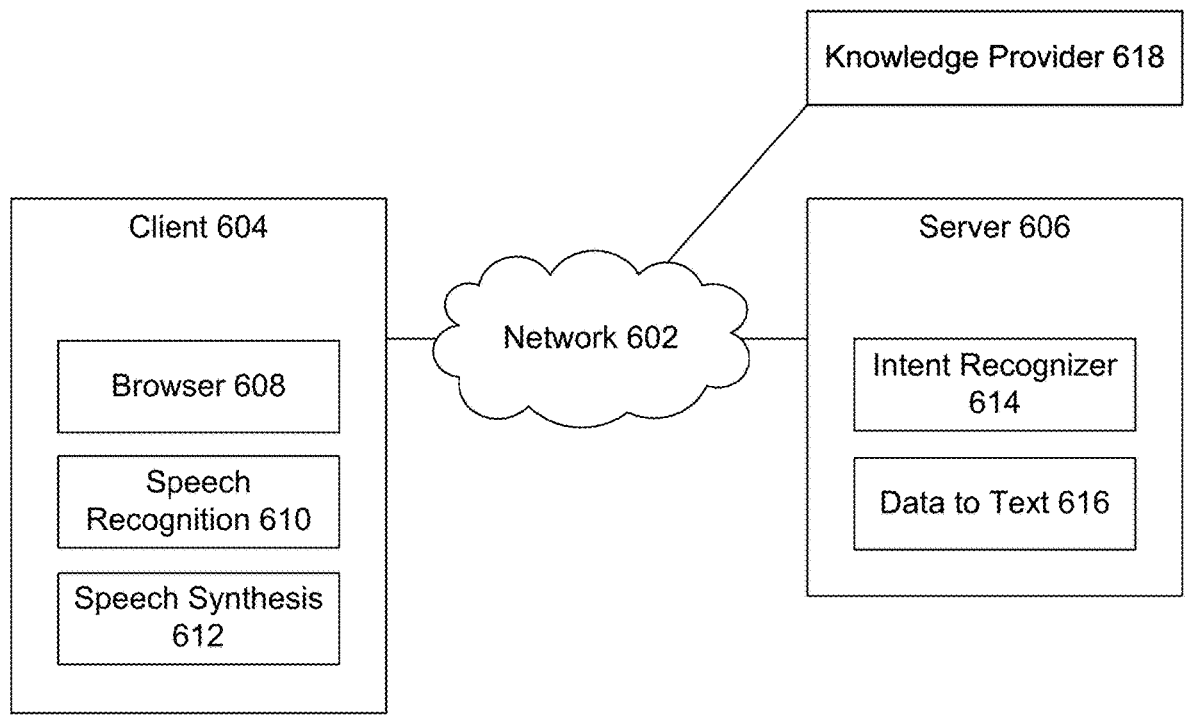
FIG. 6 is a block diagram of a client-server environment where the embodiments can be implemented.

FIG. 6 is a block diagram of client-server environment 600 where embodiments can be implemented. Example environment 600 includes a network 602, one or more client devices 604, and one or more servers 606.

Network 602 may be any network or combination of networks that can carry data communication between numerous computing devices such as client devices 604 and servers 606. Network 602 may include, but is not limited to, a local area network, metropolitan area network, and/or wide area network such as the Internet or the World Wide Web ("the Web"). To carry data communication, network 602 uses numerous protocols, such as an internet protocol ("IP"), file transfer protocol ("FTP"), transmission control protocol ("TCP"), HyperText Transfer Protocol ("HTTP"), and HyperText Transfer Protocol Secure ("HTTPS") to give a few examples. Further, intermediate web servers, gateways, or other servers may be provided between components of the system shown in FIG. 6, depending upon a particular application or environment.

Client devices 604 are electronic devices that are controlled and/or manipulated by users. Client devices 604 are capable of requesting and receiving resources, applications, data, etc., over network 602. Example client devices 604 include personal computers, laptop computers, smartphones, tablets and any other electronic devices that can connect to network 602. Client device 604 may have some or all components of an example computing device included in FIG. 7.

In an embodiment, client devices 604 and servers 606 execute applications, such as client-server applications. Client device 604 may download an application from server 606 or access the application using the Internet. Once accessed, client device 604 presents the application to a user, while the user uses the application to input request data (e.g., a question) into the application. In one embodiment, client device 604 includes speech recognition subsystem 610. A user may input a question by talking to a microphone. Speech recognition subsystem 610 may convert the user's voice into the question in the text format. Client device 604 may then transmit the question in the text format to server 606. Client device 604 also receives response data (e.g., an answer to the question) from server 606, and display the answer, in the form of a text area and/or a computer animated virtual assistant, using techniques described in methods 300, 400, and 500.

In some embodiments, server 606 sends the answer in the text format to client device 604. Client device 604 includes speech synthesis subsystem 612. Speech synthesis subsystem 612 may convert the answer in the text format to speech (e.g., sound waves). Client device 604 then plays the speech to the user. At the same time, client device 604 may display the computer animated virtual assistant, using lip synchronization techniques described in methods 300 and 400. In one embodiment, server 606 sends the answer in the text format together with the corresponding phonemes to client device 604. In another embodiment, server 606 sends the answer in the text format to client device 604, and client device 604 uses speech synthesis subsystem 612 to convert the text into corresponding phonemes.

In some embodiments, client device 604 may use web browser 608 to request and download one or more HTML documents that include scripts, images, video, embedded information (such as meta-information in hyperlinks) and embedded instructions (such as JavaScript scripts). Web browser 608 may display the downloaded HTML documents as one or more web pages. A user can use web browser 608 to input data (e.g., a question), receive response data (e.g., an answer to the question) from server 606. Client device 604 may execute the embedded instructions to display an animated virtual assistant in web browser 608 to "speak" the answer, by performing operations as described in methods 300, 400, and 500.

Server 606 is a computing device that communicates with one or more client devices 604. Server 606 executes an application (such as a web server application), receives data from and transmits data to client devices 604. Server 606 interfaces with databases or other data storage devices that store data. When server 606 receives a request from client device 604, server 606 uses its application to process the request and transmits a response back to client device 604, as needed. For example, server 606 may include intent recognizer 614. Intent recognizer 614 parses the received question in the text format and determines the intent of the text. Based on the intent of the text, intent recognizer 614 may produce a query for knowledge provider 618. Server 606 may forward the query to knowledge provider 618.

Examples of knowledge provider 618 include, but are not limited to, Google Knowledge Graph and Markit on Demand. Server 606 uses APIs (Application Programming Interfaces) to send queries to and receive result data from knowledge provider 618. Result data from knowledge provider 618 may be formatted in a programmer friendly fashion, such as JSON (JavaScript Object Notation) or XML (Extensible Markup Language). Server 606 may connect to knowledge provider 618 via network 602. In another embodiment (not shown in FIG. 6), server 606 may directly connect to knowledge provider 618. In yet another embodiment (not shown in FIG. 6), knowledge provider 618 may be a subsystem of server 606, and server 606 may communicate with knowledge provider 618 using internal APIs.

Server 606 may also include data to text subsystem 616. After server 606 receives result data from knowledge provider 618, data to text subsystem 616 translates the formatted result data (e.g., in JSON or XML) into an answer in a human readable format. For example, data to text subsystem 616 may translate the formatted result data to an answer in an English text. Server 606 may transmit the English text to client device 604.

In an embodiment, data communication between client devices 604 and server 606 may be via a HyperText Markup Language ("HTML") and include pages, scripts, images, video, embedded information (such as meta-information in hyperlinks), and embedded instructions (such as JavaScript scripts). Server 606 may have some or all components of an example computing device included in FIG. 7.

Figure 7:
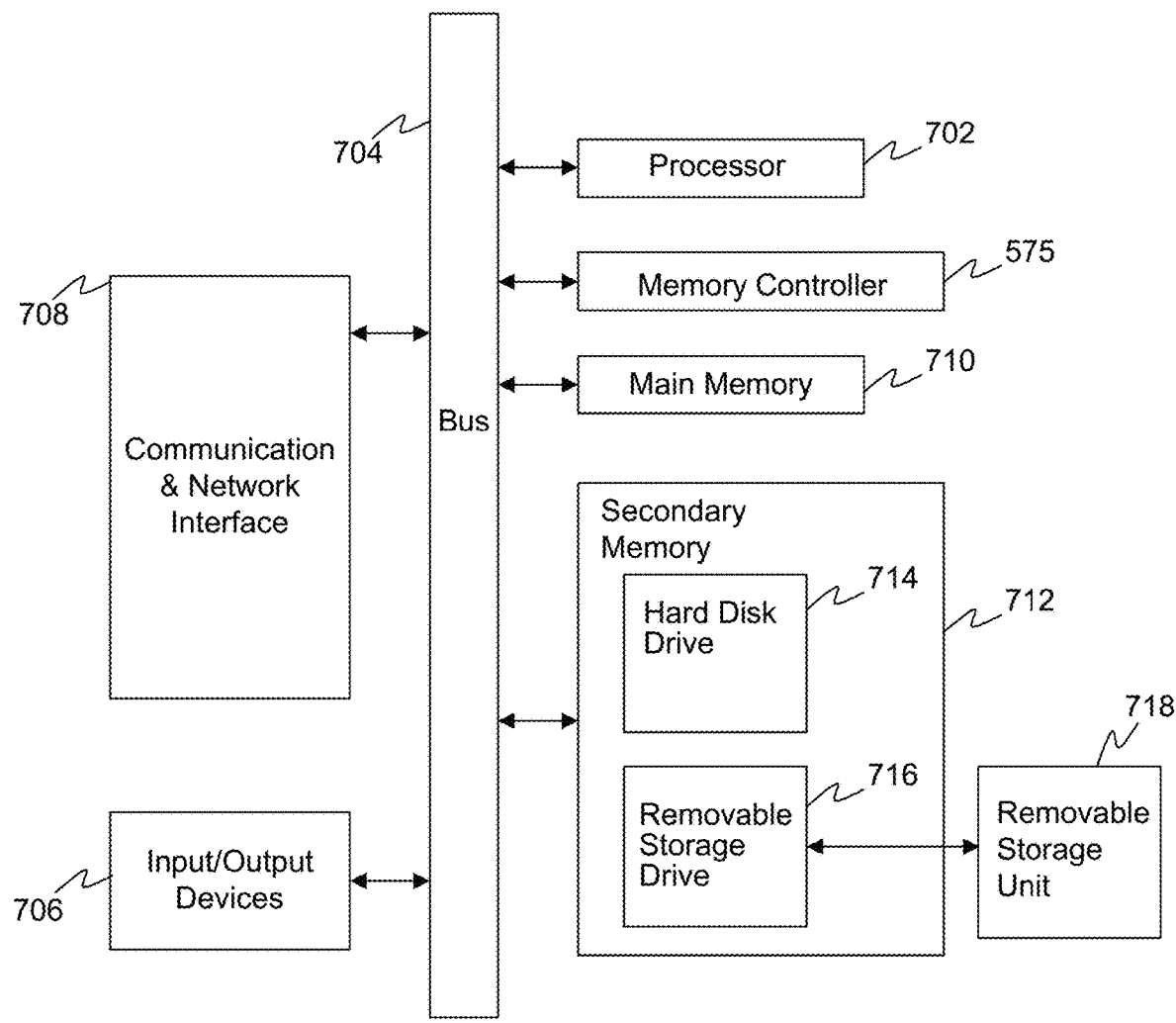
FIG. 7 is a block diagram of a computer system where the embodiments may be implemented.

Various embodiments described in FIGS. 1-6 can be implemented, for example, using one or more well-known computer systems, such as computer system 700 shown in FIG. 7. Computer system 700 can be any well-known computer capable of performing the functions described herein, such as computers available from an International Business Machine ("IBM"), Apple, Oracle, HP, Dell, Sony, Toshiba, etc.

Computer system 700 includes one or more processors, such as a processor 702. Processor 702 may include any conventional or special purpose processor, including, but not limited to, digital signal processor (DSP), field programmable gate array (FPGA), and application specific integrated circuit (ASIC). Processor 702 is connected to a communication infrastructure or bus 704.

One or more processors 702 may also be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 700 also includes user input/output device(s) 706, such as monitors, keyboards, pointing devices, etc., which communicate with communication infrastructure 708 through user input/output interface(s).

Example communication infrastructure 708 may include one or more device interconnection buses such as Ethernet, Peripheral Component Interconnect (PCI), and the like.

In an embodiment, communication infrastructure 708 enables computer system 700 to communicate and interact with any combination of remote devices, remote networks, remote entities, etc. For example, communication infrastructure 708 may allow computer system 700 to communicate with remote devices which may be wired and/or wireless, and which may include any combination of local area networks (LANs), wide area networks (WANs), the Internet, etc.

Computer system 700 also includes a main or primary memory 710, such as random access memory (RAM). Main memory 710 may include one or more levels of cache. Main memory 710 has stored therein control logic (i.e., computer software) and/or data.

Computer system 700 may also include one or more secondary storage devices or memory 712. Secondary memory 712 may include, for example, a hard disk drive 714 and/or a removable storage device or drive 716. Removable storage drive 716 may be a floppy disk drive, a magnetic tape drive, a compact disk drive, an optical storage device, tape backup device, and/or any other storage device/drive.

Removable storage drive 716 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 716 reads from and/or writes to removable storage unit 718 in a well-known manner.

According to an exemplary embodiment, secondary memory 712 may include other means, instrumentalities or other approaches for allowing computer programs and/or other instructions and/or data to be accessed by computer system 700. Such means, instrumentalities or other approaches may include, a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor, and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A device comprising:
a processor and a memory coupled to the processor, wherein the memory stores:
predetermined data including (i) a progressive transition rule and (ii) a plurality of animation models, wherein each of the plurality of animation models corresponds to a respective one of a plurality of phonemes; and
instructions that, upon execution, cause the processor to:
receive a request from a user;
obtain an answer to the request, wherein the answer includes a first indicator and a second indicator, wherein the first indicator corresponds to a first phoneme of the plurality of phonemes, and wherein the second indicator corresponds to a second phoneme of the plurality of phonemes;
according to the first indicator, identify a first animation model of the plurality of animation models that corresponds to the first phoneme;
according to the second indicator, identify a second animation model of the plurality of animation models that corresponds to the second phoneme;

generate a transition animation model according to the progressive transition rule using the first animation model and the second animation model;
generate images according to the first animation model, the transition animation model, and the second animation model; and
output the images to the user via a display.

2. The device of claim 1 wherein the predetermined data is obtained prior to receiving the request from the user.

3. The device of claim 1 wherein:
the first animation model depicts a first mouth position corresponding to the first phoneme,
the second animation model depicts a second mouth position corresponding to the second phoneme, and
the transition animation model depicts a transitional mouth position between the first mouth position and the second mouth position.

4. The device of claim 3 wherein each mouth position is represented solely by a mouth width and an angle of mouth openness.

5. The device of claim 1 wherein:
the instructions, upon execution, cause the processor to determine a transition duration, and
the transition duration is a time period between displaying a first image according to the first animation model and displaying a second image according to the second animation model.

6. The device of claim 5 wherein the instructions, upon execution, cause the processor to:
in response to the transition duration being less than a predetermined minimum threshold, set the transition duration equal to the predetermined minimum threshold, and
in response to the transition duration being greater than a predetermined maximum threshold, set the transition duration equal to the predetermined maximum threshold.

7. The device of claim 5 wherein:
the transition animation model includes a set of frames,
a total number of the set of frames is based on the transition duration, and
each frame of the set of frames has a corresponding mouth position between a first mouth position and a second mouth position.

8. The device of claim 7 wherein the instructions, upon execution, cause the processor to perform linear interpolation between the first animation model and the second animation model, for a first frame of the set of frames, based on a position of the first frame within the set of frames, to determine the corresponding mouth position between the first mouth position and the second mouth position for the first frame.

9. The device of claim 1 wherein the instructions, upon execution, cause the processor to:
transmit, via a communication system, the request to a server, and
obtain, via the communication system, the answer from the server.

10. The device of claim 1 wherein the instructions, upon execution, cause the processor to:
receive verbal input from the user,
perform speech recognition to convert the verbal input into a text string, and
include the text string in the request.

11. The device of claim 1 wherein the instructions, upon execution, cause the processor to:
output a first sound associated with the first phoneme in synchronization with outputting of a first image according to the first animation model, and
output a second sound associated with the second phoneme in synchronization with outputting of a second image according to the second animation model.

12. The device of claim 11 wherein the predetermined data includes the first sound and the second sound.

13. The device of claim 11 wherein the answer includes the first sound and the second sound.

14. The device of claim 11 wherein the instructions, upon execution, cause the processor to generate the first and second sounds using a text-to-speech engine based on text information in the answer.

15. A non-transitory computer-readable medium storing processor-executable instructions, the instructions comprising:
receiving a request from a user;
obtaining an answer to the request, wherein the answer includes a first indicator and a second indicator, wherein the first indicator corresponds to a first phoneme of a plurality of phonemes, and wherein the second indicator corresponds to a second phoneme of the plurality of phonemes;
according to the first indicator, identifying a first animation model of a plurality of animation models that corresponds to the first phoneme, wherein each of the plurality of animation models corresponds to a respective one of the plurality of phonemes, and wherein the plurality of animation models are obtained prior to receiving the request from the user;
according to the second indicator, identifying a second animation model of the plurality of animation models that corresponds to the second phoneme;
generating a transition animation model according to a progressive transition rule using the first animation model and the second animation model, wherein the progressive transition rule is obtained prior to receiving the request from the user;
generating images according to the first animation model, the transition animation model, and the second animation model; and
outputting the images to the user via a display.

16. The non-transitory computer-readable medium of claim 15 wherein:
the first animation model depicts a first mouth position corresponding to the first phoneme,
the second animation model depicts a second mouth position corresponding to the second phoneme, and
the transition animation model depicts a transitional mouth position between the first mouth position and the second mouth position.

17. The non-transitory computer-readable medium of claim 16 wherein each mouth position is represented solely by a mouth width and an angle of mouth openness.

18. The non-transitory computer-readable medium of claim 15 wherein:
the instructions comprise determining a transition duration,
the transition duration is a time period between displaying a first image according to the first animation model and displaying a second image according to the second animation model,
the transition animation model includes a set of frames,
a total number of the set of frames is based on the transition duration, and each frame of the set of frames has a corresponding mouth position between a first mouth position and a second mouth position.

19. The non-transitory computer-readable medium of claim 18 wherein the instructions comprise performing linear interpolation between the first animation model and the second animation model, for a first frame of the set of frames, based on a position of the first frame within the set of frames, to determine the corresponding mouth position between the first mouth position and the second mouth position for the first frame.

20. The non-transitory computer-readable medium of claim 18 wherein the instructions comprise:
- outputting a first sound associated with the first phoneme in synchronization with outputting of a first image according to the first animation model, and
- outputting a second sound associated with the second phoneme in synchronization with outputting of a second image according to the second animation model.

* * * * *